US011230480B2

(12) United States Patent
Ghaffour et al.

(10) Patent No.: US 11,230,480 B2
(45) Date of Patent: Jan. 25, 2022

(54) METHOD FOR HYBRIDIZED DESALINATION SYSTEM USING MEMBRANE DISTILLATION AND ADSORPTION DESALINATION CYCLES

(71) Applicant: KING ABDULLAH UNIVERSITY OF SCIENCE AND TECHNOLOGY, Thuwal (SA)

(72) Inventors: Noreddine Ghaffour, Thuwal (SA); Kim Choon Ng, Thuwal (SA); Kyaw Thu, Thuwal (SA); Muhammad Wakil Shahzad, Rahim Yar Khan (PK)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 327 days.

(21) Appl. No.: 16/316,190

(22) PCT Filed: Aug. 3, 2017

(86) PCT No.: PCT/IB2017/054768
§ 371 (c)(1),
(2) Date: Jan. 8, 2019

(87) PCT Pub. No.: WO2018/025224
PCT Pub. Date: Feb. 8, 2018

(65) Prior Publication Data
US 2020/0148558 A1    May 14, 2020

Related U.S. Application Data

(60) Provisional application No. 62/371,503, filed on Aug. 5, 2016.

(51) Int. Cl.
*C02F 1/28* (2006.01)
*C02F 1/44* (2006.01)
(Continued)

(52) U.S. Cl.
CPC ............ *C02F 1/447* (2013.01); *B01D 61/364* (2013.01); *B01D 61/366* (2013.01); *C02F 1/281* (2013.01);
(Continued)

(58) Field of Classification Search
CPC ...... C02F 1/447; C02F 1/281; C02F 2103/08; C02F 2301/063; C02F 2301/08;
(Continued)

(56) References Cited

U.S. PATENT DOCUMENTS

2010/0170776 A1* 7/2010 Ehrenberg ........... B01D 63/085
                                                                202/168
2013/0341177 A1* 12/2013 Ng ......................... C02F 1/043
                                                                203/10

OTHER PUBLICATIONS

Kyaw Th, Young-Deuk Kim, Gary Amya, Won Gee Chun, Kim Choon Ng, A hybrid multi-effect distillation and adsorption cycle, Applied Energy 104 (2013) 810-821. (Year: 2013).*
(Continued)

*Primary Examiner* — Pranav N Patel
(74) *Attorney, Agent, or Firm* — Patent Portfolio Builders PLLC (57) ABSTRACT

The present disclosure describes a desalination system, comprising a membrane distillation unit; a preheater having a liquid inlet and a liquid outlet, the outlet being in communication with the inlet; an evaporator in communication with the liquid outlet of the MD, and having a fluid inlet configured to provide heat to aqueous liquid in the evaporator, the evaporator having a vapor outlet; at least one adsorption-desorption unit, having a vapor inlet in communication with the vapor outlet of the evaporator, the AD including a fluid inlet configured to receive either a heating or a cooling fluid and a fluid outlet, the AD having a vapor outlet and further including a fluid inlet in communication with the fluid inlet of the AD, a fluid outlet in communica-
(Continued)

tion with the heating fluid inlet of the preheater; and a condenser in communication with the permeate vapor outlet of the MD or the AD or both and having a condensation outlet.

17 Claims, 2 Drawing Sheets

(51) Int. Cl.
    *B01D 61/36*     (2006.01)
    *C02F 103/08*     (2006.01)

(52) U.S. Cl.
    CPC .. *B01D 2311/2626* (2013.01); *B01D 2313/40* (2013.01); *C02F 2103/08* (2013.01); *C02F 2301/063* (2013.01); *C02F 2301/08* (2013.01); *C02F 2303/10* (2013.01)

(58) Field of Classification Search
    CPC . C02F 2303/10; B01D 61/364; B01D 61/366; B01D 2311/2626; B01D 2313/40; Y02W 10/37; Y02A 20/131
    See application file for complete search history.

(56) References Cited

OTHER PUBLICATIONS

Alsaadi, A.S., et al., "Evaluation of air gap membrane distillation process running under sub-atmospheric conditions: Experimental and simulation studies," Journal of Membrane Science, vol. 489, Sep. 1, 2015 (Available online Apr. 16, 2015), pp. 73-80.

Alsaadi, A.S., et al., "Experimental and theoretical analyses of temperature polarization effect in vacuum membrane distillation," Journal of Membrane Science, vol. 471, Dec. 1, 2014 (Available online Aug. 13, 2014), pp. 138-148.

Chen, Y.-H., et al., "Optimal design and control of solar driven air gap membrane distillation desalination systems," Applied Energy, vol. 100, Dec. 2012 (Available online Mar. 30, 2012), pp. 193-204.

Francis, L., et al., "Material gap membrane distillation: A new design for water vapor flux enhancement," Journal of Membrane Science, vol. 448, Dec. 15, 2013 (Available online Aug. 20, 2013), pp. 240-247.

Francis, L., et al., "Performance evaluation of the DCMD desalination process under bench scale and large scale module operating conditions," Journal of Membrane Science, vol. 455, Apr. 1, 2014 (Available online Dec. 25, 2013), pp. 103-112.

Ghaffour, N., et al., "Seawater desalination using renewable energy: solar, geothermal, and wind," Applied Energy, vol. 136, Dec. 31, 2014 (Definitive Version Published Apr. 13, 2014), pp. 1155-1165 (34 pages total).

He, F., et al., "High water recovery in direct contact membrane distillation using a series of cascades," Desalination, vol. 323, Aug. 15, 2013 (Available online Sep. 1, 2012), pp. 48-54.

Khayet, M., "Membranes and theoretical modeling of membrane distillation: A review," Advances in Colloid and Interface Science, vol. 164, Issues 1-2, May 11, 2011 (Available online Nov. 10, 2010), pp. 56-88.

Kim, Y.-D., et al., "Performance investigation of a solar-assisted direct contact membrane distillation system," Journal of Membrane Science, vol. 427, Jan. 15, 2013 (Available online Oct. 16, 2012), pp. 345-364.

Matsukata, M., et al., "Chapter 8—Review on Prospects for Energy Saving in Distillation Process with Microporous Membranes," Membrane Science and Technology, vol. 14, 2011 (Available online May 4, 2011), pp. 175-193.

Ng, K.C., et al., "Solar-assisted dual-effect adsorption cycle for the production of cooling effect and potable water," International Journal of Low-Carbon Technologies, vol. 4, Issue 2, Jun. 2009 (Advance Access Publication May 17, 2009), pp. 61-67.

Thu, K., "Adsorption Desalination: Theory & Experiments," National University of Singapore, A Thesis Submitted for the Degree of Doctor of Philosophy, Department of Mechanical Engineering, 2010, 259 pages.

Thu, K., et al., "Numerical simulation and performance investigation of an advanced adsorption desalination cycle," Desalination, vol. 308, Jan. 2, 2013 (Available online May 14, 2012), pp. 209-218.

Thu, K., et al., "Operational strategy of adsorption desalination systems," International Journal of Heat and Mass Transfer, vol. 52, Issues 7-8, Mar. 2009 (Available online Dec. 6, 2008), pp. 1811-1816.

Thu, K., et al., "Performance investigation of advanced adsorption desalination cycle with condenser-evaporator heat recovery scheme," Desalination and Water Treatment, vol. 51, Nos. 1-3, Jan. 2013 (Published online Jun. 18, 2012; presented at the International Conference on Desalination for the Environment, Clean Water and Energy, European Desalination Society, Apr. 23-26, 2012, Barcelona, Spain), pp. 150-163.

Van Der Bruggen, B., et al., "Distillation vs. membrane filtration: overview of process evolutions in seawater desalination," Desalination, vol. 143, Issue 3, Jun. 10, 2002, pp. 207-218.

International Search Report in corresponding/related International Application No. PCT/IB2017/054768, dated Oct. 23, 2017.

Kim, Y.-D., et al., "A Novel Integrated Thermal-/Membrane-Based Solar Energy-Driven Hybrid Desalination System: Concept Description and Simulation Results," Water Research, May 3, 2016, vol. 100, pp. 7-9, Elsevier, Amsterdam, NL.

Written Opinion of the International Searching Authority in corresponding/related International Application No. PCT/IB2017/054768, dated Oct. 23, 2017.

\* cited by examiner

METHOD FOR HYBRIDIZED DESALINATION SYSTEM USING MEMBRANE DISTILLATION AND ADSORPTION DESALINATION CYCLES

CROSS-REFERENCE TO RELATED APPLICATIONS

This application is a U.S. National Stage Application of International Application No. PCT/IB2017/054768, filed on Aug. 3, 2017, entitled "METHOD FOR HYBRIDIZED DESALINATION SYSTEM USING MEMBRANE DISTILLATION AND ADSORPTION DESALINATION CYCLES," which claims priority and benefit from U.S. Provisional Application No. 62/371,503, filed Aug. 5, 2016, the entire contents of which are incorporated herein by reference.

TECHNICAL FIELD

The present disclosure generally relates to production of potable water or other useable water from an aqueous feed, such as seawater, brine water, industrial waste water and produced water.

BACKGROUND

Membrane distillation (MD) systems are efficient in converting seawater or any other impaired or harsh water quality, such as desalination or concentrated brines, industrial wastewater and produced water, to very high quality water (distilled water) (Van der Bruggen and Vandecasteele, 2002, Chen et al., 2012, Kim et al., 2013). The MD process is operational utilizing low-grade temperature heat sources, such as solar energy, process low-grade waste heat or low-enthalpy geothermal energy sources (Ghaffour et al., 2014). Some of the advantages of the MD systems include: 1) the utilization of low-temperature heat sources (as low as 60° C.) at low pressure, requiring less energy and incurring less fouling and scaling; 2) the direct recovery or utilization of thermal energy in the feed stream (i.e., the hot feed streams from process coolant or produced water) without the use of heat exchangers; 3) the production of high quality product water (theoretically 100% rejection) regardless of the feed water quality; 4) the volume per unit production due to the utilization of highly porous hydrophobic membrane materials; and 5) the process is scalable, modular and low-cost as most of the unit parts are made using plastic based materials. (See, e.g., Khayet, 2011, Alsaadi et al., 2014, Francis et al., 2014, Alsaadi et al., 2015).

Yet, there still exist many gaps in the research on MD. Multiple challenges remain, such as enhancing the flux and making the MD process more energy-efficient and cost-effective, before MD reaches a level that can compete with the reverse osmosis (RO) process and before it can be fully applicable to the industry. (He et al., 2013, Khayet, 2011, Matsukata et al., 2011).

SUMMARY

The present disclosure addresses the aforementioned challenges. In various aspects, methods and systems are provided herein for the hybridization of membrane distillation (MD) and adsorption desalination (AD) cycles and their use, for example their use in recovering useable water from impaired or harsh water. Hybridizing the two thermally-driven systems can provide thermodynamic synergy between the membrane distillation (MD) process and an adsorption desalination (AD) cycle. The hybrid system can be integrated offering several advantages, including: the use of a vacuum environment in the AD to drive a membrane distillation (MD) system without the need for additional vacuum pump(s); the use of the child water (coolant) produced by AD to run any type of MD configuration (Francis et al., 2013); the enhancement of total water recovery by treating MD brines using AD or treating any impaired water quality simultaneously with AD; and the utilization of waste heat after a desorption process to assist in pre-heating the MD feed.

In various aspects, the AD cycle can include an evaporator. The evaporator can operate at low temperature, for example, below 10° C. In various aspects, the evaporator can operate at a temperature as low as 10° C. Other AD components such as cooling towers, solar modulating systems, tanks, and deaerators can also be used in the hybrid system in an integrated manner.

The AD cycle can employ sorption phenomena for the production of potable water from aqueous feed and a cooling power utilizing low-temperature heat sources. In various aspects, by low temperature heat sources, we mean temperatures of 55° C. to 85° C. and anywhere there between. The advantages and the detailed working principles of the AD cycles can be found in Ng et al., 2009, Thu et al., 20019, Thu et al., 2010, Thu et al., 2013a, Thu et al., 2013b. In the AD cycle, the evaporator can operate at low temperature because of uptake of water vapor by the adsorbent material. Thus, AD and MD processes can be synergistically hybridized for overall system performance and improvement.

A number of benefits can be achieved by the present methods and systems. Integration can increase overall system recovery by utilizing the MD brine as a feed for an AD evaporator, as an example of potential application. Since the AD evaporator can operate at low temperature, it can recover as much as 85% (240,000 ppm) potable water without fouling and corrosion risks. The AD cycle can operate with waste heat or low-grade renewable energy sources (for example, from 55° C. to 85° C.). This heat can be utilized to pre-heat the MD feed to enhance the evaporation rate. An external heat source can be used to further heat the MD feed that can be beneficial to increasing the MD flux.

The present disclosure can be applicable to any type of MD process configuration, such as direct contact membrane distillation (DCMD), vacuum membrane distillation (VMD), air gap membrane distillation (AGMD), material gap membrane distillation (MGMD), and sweeping gas membrane distillation (SGMD). The AD cycle can apply sorption principles, such as adsorption and desorption processes, where the adsorbent material can be any porous hydrophilic material. Examples of suitable absorbents include, but are not limited to, adsorbents such as silica gel or zeolites.

The present hybridization scheme can provide a practical large-scale MD process for multiple heat recovery configurations such as multi-effect membrane distillation (MEMD) or multi-stage membrane distillation (MSMD) units for improved heat recovery and gain output ratio (GOR) or performance ratio (PR). With the present synergistically hybridized cycle, a quantum jump in useable water production with improved specific energy consumption in (kWh/$m^3$) can be realized. Furthermore, the new hybrid AD+MD system disclosed herein can treat any impaired water quality with harsh conditions, such as desalination or concentrated brines, industrial wastewater or produced water by producing very high quality water regardless of the feed water quality. It can also run autonomously without the need to connect to electrical grid (low thermal and electrical energy consumptions), is easy to operate, modular and scalable.

In an embodiment, a system for desalination of aqueous feed is provided. The system can comprise a membrane distillation unit, the membrane distillation unit including a vapor permeable membrane and a high pressure side to one side of the membrane and a low pressure side to a side of the membrane opposite the high pressure side for receiving aqueous vapor permeate that passes from the high pressure side through the membrane to the low pressure side, the high pressure side having a higher vapor pressure relative to the low pressure side, the high pressure side having an aqueous feed liquid inlet and a liquid outlet, and the low pressure side having a permeate vapor outlet; a preheater having an aqueous feed liquid inlet and an aqueous feed liquid outlet, the aqueous feed liquid outlet being in communication with the aqueous feed liquid inlet of the membrane distillation unit, the preheater having a heating fluid inlet and an outlet for heating fluid; an evaporator in communication with the liquid outlet of the membrane distillation unit, the evaporator having a fluid inlet configured to provide heat of evaporation to aqueous liquid in the evaporator received from the liquid outlet of the membrane distillation unit and a fluid outlet configured to discharge fluid from the evaporator, the evaporator having a vapor outlet for discharging vapor formed by evaporation of aqueous liquid in the evaporator received from the aqueous liquid outlet of the membrane distillation unit; at least one adsorption-desorption unit, the adsorption-desorption unit having a vapor inlet in communication with the vapor outlet of the evaporator and configured to receive aqueous vapor from the evaporator, the adsorption-desorption unit including an adsorption-desorption bed, the adsorption-desorption bed including a fluid inlet configured to receive either a heating or a cooling fluid and a fluid outlet, the adsorption-desorption unit having a vapor outlet, the adsorption-desorption unit further including a fluid inlet in communication with the fluid inlet of the adsorption-desorption bed, the adsorption-desorption unit including a fluid outlet in communication with the fluid outlet of the adsorption-desorption bed and in communication with the heating fluid inlet of the preheater; and a condenser including a condensation surface and a vapor inlet in communication with the permeate vapor outlet of the membrane distillation unit or the vapor outlet of the adsorption-desorption chamber or both, the vapor inlet of the condenser configured to deliver vapor from the membrane distillation unit or the adsorption-desorption chamber or both to the condensation surface, the condenser including a condensation outlet configured to remove condensate from the condenser, the condenser including a fluid inlet configured to deliver fluid from the evaporator to a surface of the condensation surface and to cool the condensation surface, and a fluid outlet configured to return the fluid from the condenser back to the evaporator and ultimately for return of the fluid to the fluid inlet of the condenser in a closed loop.

In various aspects, the membrane distillation unit can include a plurality of membrane distillation modules configured for multi-effect membrane distillation. Each membrane distillation module can include a vapor permeable membrane and a high pressure side to one side of the membrane and a low pressure side to a side of the membrane opposite the high pressure side for receiving aqueous vapor permeate that passes from the high pressure side through the membrane to the low pressure side. The high pressure side can have a higher vapor pressure relative to the low pressure side. The high pressure side can have an aqueous feed liquid inlet and a liquid outlet, and the low pressure side can have a permeate vapor outlet. The permeate vapor outlet of each membrane distillation module can be in communication with the aqueous vapor inlet of the condenser.

In any one or more aspects, the fluid outlet of the adsorption-desorption unit, the heating fluid inlet and outlet of the preheater and the fluid inlet of the adsorption-desorption unit can be in a closed loop configured to provide heating fluid and heat of desorption to the adsorption-desorption bed and waste heat from the adsorption-desorption unit to the preheater for preheating the aqueous feed to the preheater. The adsorption-desorption bed can include a hydrophilic porous material having a surface area higher than 400 $m^2/g$. The fluid inlet and outlet of the adsorption-desorption unit can be part of a closed loop configured to provide a cooling fluid to the adsorption-desorption bed. The adsorption-desorption unit can include a plurality of adsorption-desorption chambers, each chamber having a vapor inlet in communication with the vapor outlet of the evaporator and configured to receive vapor from the evaporator. Each chamber can further include an adsorption-desorption bed, the adsorption-desorption bed including a fluid inlet configured to receive either a heating or a cooling fluid and a fluid outlet, and having a vapor outlet. Each chamber can further include a fluid inlet in communication with the fluid inlet of the adsorption-desorption bed and a fluid outlet in communication with the fluid outlet of the adsorption-desorption bed and in communication with the heating fluid inlet of the preheater. The condenser can be configured to operate under vacuum. The fluid inlet and outlet of the evaporator and the fluid inlet and outlet of the condenser can be in a closed loop configured to provide a heating fluid to the evaporator and return the fluid to the condenser as a cooling fluid for the condenser. The low pressure side of the membrane distillation modules configured as a multi effect or a multi stage membrane distillation unit can be controlled by the condenser.

In an embodiment, a method for desalination of aqueous feed is provided. The method can comprise: providing a membrane distillation unit, the membrane distillation unit including a vapor permeable membrane and a high pressure side to one side of the membrane and a low pressure side to a side of the membrane opposite the high pressure side, the high pressure side having an aqueous feed liquid inlet and a liquid outlet, and the low pressure side having a permeate vapor outlet; heating an aqueous feed liquid and delivering the heated aqueous feed liquid into the high pressure side of the membrane distillation unit through the aqueous feed liquid inlet of the membrane distillation unit; passing aqueous vapor permeate from the high pressure side of the membrane distillation unit through the membrane to the low pressure side of the membrane distillation unit; taking aqueous liquid from the high pressure side of the membrane distillation unit and evaporating at least a portion of the aqueous liquid to produce an aqueous vapor; providing at least one adsorption-desorption unit, the adsorption-desorption unit having a vapor inlet configured to receive aqueous vapor from the evaporation, the adsorption-desorption unit including an adsorption-desorption bed, the adsorption-desorption unit including a fluid inlet configured to receive either a heating or a cooling fluid and a fluid outlet; alternately adsorbing and desorbing the aqueous vapor from the evaporation using the adsorption-desorption unit; and taking aqueous vapor that has been absorbed and desorbed by the absorption-desorption unit and condensing the aqueous vapor to produce a desalinated aqueous product and taking the aqueous vapor permeate from the low pressure side of the membrane distillation unit and condensing the aqueous vapor permeate to produce aqueous product.

In various aspects of the method, the membrane distillation unit can include a plurality of membrane distillation modules configured for multi-effect membrane distillation. Each membrane distillation module can include a vapor permeable membrane and a high pressure side to one side of the membrane and a low pressure side to a side of the membrane opposite the high pressure side for receiving aqueous vapor permeate that passes from the high pressure side through the membrane to the low pressure side. The high pressure side can have a higher vapor pressure relative to the low pressure side. The high pressure side can have an aqueous feed liquid inlet and a liquid outlet, and the low pressure side can have a permeate vapor outlet. The permeate vapor outlet of each membrane distillation module can be in communication with the aqueous vapor inlet of a condenser.

In any one or more aspects, the aqueous vapor from the evaporation can be alternately absorbed and desorbed by the adsorption-desorption unit by alternately heating and cooling the adsorption-desorption bed by alternatively providing a heating or a cooling fluid to the adsorption-desorption bed. A heater for the aqueous feed liquid can be provided, the heater having a heating fluid inlet and a heating fluid outlet, wherein the fluid outlet of the adsorption-desorption unit, the heating fluid inlet and outlet of the heater and the fluid inlet of the adsorption-desorption unit are in a closed loop configured for providing heating fluid and heat of desorption to the adsorption-desorption bed and waste heat from the adsorption-desorption unit to the heater for heating the aqueous feed to the heater. The adsorption-desorption bed can include a hydrophilic porous material having a surface area higher than 400 $m^2/g$. The fluid inlet and outlet of the adsorption-desorption unit can be part of a closed loop configured for providing a cooling fluid to the adsorption-desorption bed. The adsorption-desorption unit can include a plurality of adsorption-desorption chambers. Each chamber can have a vapor inlet for receiving aqueous vapor from the evaporation. Each chamber can include an adsorption-desorption bed, each adsorption-desorption bed including a fluid inlet configured for receiving either a heating or a cooling fluid and a fluid outlet, and having a vapor outlet. Each chamber can include a fluid inlet in communication with the fluid inlet of the adsorption-desorption bed, and a fluid outlet in communication with the fluid outlet of the adsorption-desorption bed and in communication with the heating fluid inlet of the preheater. The condensing of the aqueous vapor from the adsorption-desorption unit can be done under vacuum. The method can include heating a fluid used for condensing the aqueous vapor from the adsorption-desorption unit from the heat of condensation of the aqueous vapor and using the heated fluid for evaporating the at least a portion of the aqueous liquid from the membrane distillation unit and after the evaporation returning the fluid to be used for condensing aqueous vapor from the adsorption-desorption unit.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Described below are various embodiments of the present systems and methods for hybridized desalination of an aqueous feed. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

DISCUSSION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, synthetic inorganic chemistry, analytical chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in bar. Standard temperature and pressure are defined as 0° C. and 1 bar.

It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DESCRIPTION

Various embodiments and aspects of methods and systems for hybridized desalination using membrane distillation and adsorption desalination cycles are provided herein. In various aspects, the present methods and systems hybridize a membrane distillation (MD) process with an adsorption desalination (AD) cycle. In one or more aspects, the hybridization is carried out by connecting a low pressure side of membrane distillation (for example a vacuum side for a vacuum membrane distillation configuration) or other low pressure or low temperature side of an MD process with the condenser of an adsorption desalination (AD) cycle. In one or more aspects, waste heat of the desorption cycle of the AD process can be used to heat the aqueous feed to the membrane distillation (MD) cycle. In addition, membrane distillation brine flows from the MD cycle to an evaporator in the AD cycle. The evaporator can be connected to one or more adsorption desalination adsorbent beds in the AD cycle, which in its turn can be connected with a condenser for enhanced water recovery.

Figure 1:
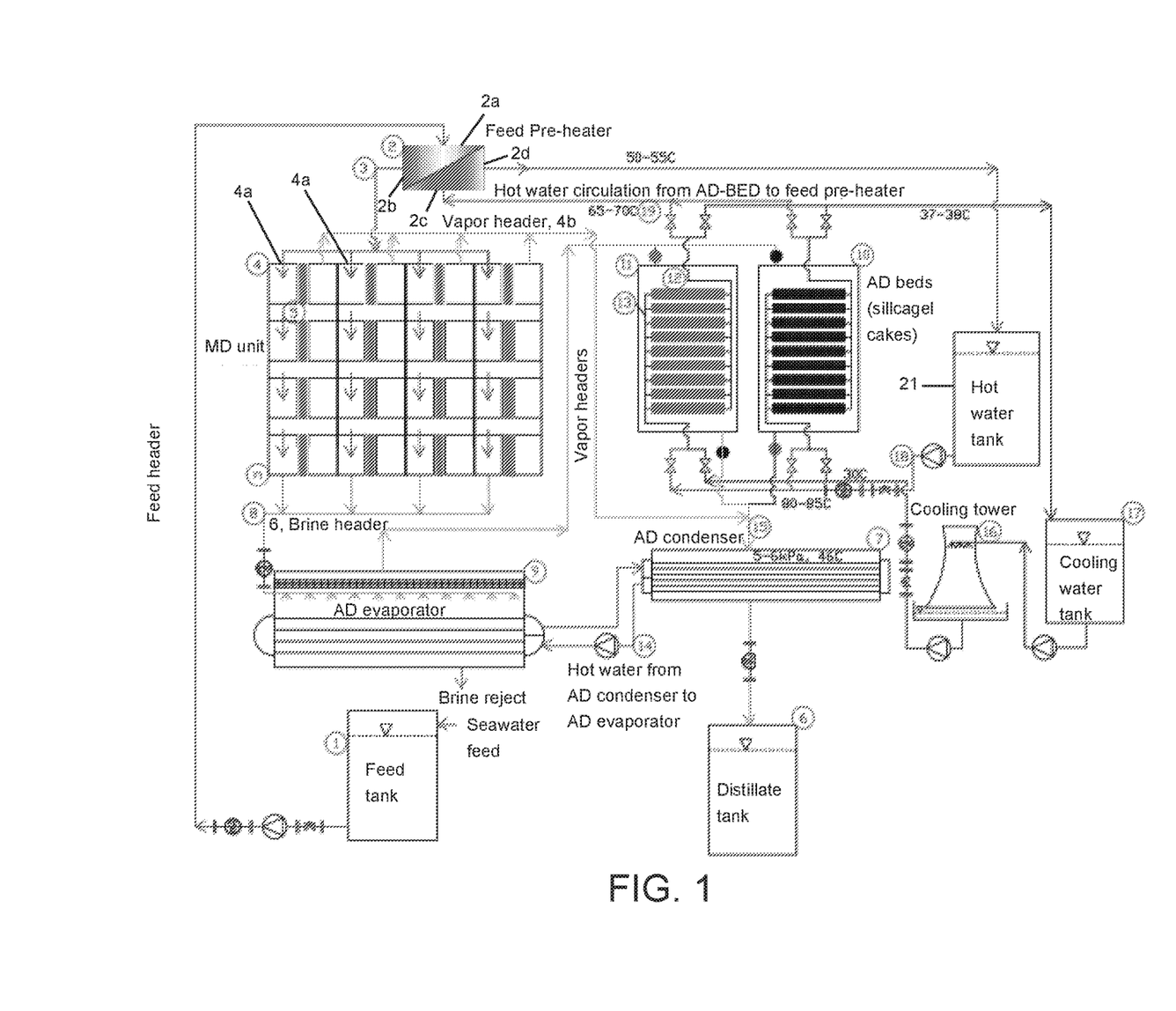
FIG. 1 is a schematic diagram of an aspect of a hybridized a MEMD and AD cycle of the present disclosure.

FIG. 1 shows one embodiment of our present systems and methods in which a multi-effect membrane distillation (MEMD) system is hybridized with an adsorption desalination (AD) cycle. In this embodiment, at least three synergetic effects are demonstrated, namely; (i) MEMD brine reutilization in AD as feed for higher recovery, (ii) AD waste heat utilization for MEMD feed preheating to improve the system's performance, and (iii) connection of the MEMD unit to the condenser of the AD to drive the MD process by creating the required vacuum pressure, or low pressure side, across the membrane.

Aqueous feed, e.g. seawater, is supplied from a deaerator (not shown) to tank 1. The deaerator can remove non-condensable gases (such as $N_2$, $O_2$, $CO_2$ and the like) in the feed to the MD cycle or system. In FIG. 1, the MD system is shown as a multi-effect membrane distillation (MEMD) system that includes a plurality of MD modules forming an MD unit 4.

Before supplying the aqueous feed to the MD unit 4, the feed can be passed through a feed preheater 2 to extract heat from the AD desorption process. The preheater 2 can have an aqueous feed input 2a and an aqueous feed outlet 2b. The aqueous feed can be a liquid aqueous feed. The preheater 2 can also have a heating fluid inlet 2c and a heating fluid outlet 2d. The aqueous feed can be heated by a heating fluid, such as hot water, passed through a conduct, such as a pipe, 19 from the AD cycle to the heating fluid inlet 2c to the preheater 2. In one or more aspects, the heating fluid for heating the preheater 2 can be in the range of about 65° C. to about 70° C. In one or more aspects, the heating fluid can be in the range of about 50° C. to about 55° C. as it exits the preheater 2. The heating fluid that exits the preheater 2 can be delivered to a heating fluid tank 21, for example a hot water tank, and can ultimately be returned to one or more AD chambers, as described below. In an aspect, the preheater 2 can be a heat exchanger or feed pre-heater. An additional heat source (not shown) can be used through or with the heat exchanger 2 to increase the aqueous feed temperature to enhance the flux across the membrane(s) in the MD unit 4.

The MD unit 4 can be formed of one or more membrane distillation (MD) modules (see, for example, FIG. 2 and its discussion below). Preferably, the MD unit 4 is formed of a plurality of MD modules to form an MEMD system. The modules of the MEMD system can be arranged in a vertical manner so that feed can flow by gravity from the top or upper module(s) of the MD unit 4 to the bottom module(s). The preheated aqueous feed 3 exiting the preheater 2 can be supplied through an aqueous feed inlet 4a by an aqueous feed conduit 3 to the high pressure side or evaporator side of an MD module of a first effect of the MD unit 4. By high pressure, we mean the pressure on the evaporator side of the MD module is relatively higher than the pressure on the opposed side, or outlet side, of the MD module. Some of the aqueous feed is evaporated through a hydrophobic membrane material with a drop in temperature due to removal of latent heat producing an aqueous vapor on the opposite side of the membrane. The remainder of the aqueous feed 5 can be outlet or discharged from the MD module of the first effect and supplied to an MD module of a next lower effect and so on where additional aqueous vapor can be produced.

The produced aqueous vapor can be delivered from the MD unit 4 through a vapor outlet in the MD unit 4 and through a conduit, for example through a vapor header 4b, to a condenser 7 of the condenser side of the AD cycle where it can be condensed along with the vapor released from the AD adsorbent (desorption) side of the AD cycle. In one or more aspects, the condenser 7 can be operated at a pressure in the range of about 5-6 kPa and at a temperature in the range of about 42° C. to about 46° C. The total condensed product, for example potable water, can be collected in a tank, such as distillate tank 6.

The process of producing the vapor can be repeated at the successive MEMD effects at lower temperatures and pressures until the last effect. The first effect of the MD unit 4 can include a plurality of individual MD modules. The MD unit 4 can be comprised of a plurality of such effects, each having for example a number of individual MD modules. While FIG. 1 shows an array of four effects, each having four individual MD modules, one skilled in the art will recognize that the MD unit 4 can include more than four or less than four effects and each effect can have more than four or less than four MD modules.

MEMD brine reject 8 from the last module or effect of the MD unit 4 can be supplied through an aqueous liquid outlet 6, for example through a brine header, to an evaporator 9 of the AD cycle. In an aspect, the reject 8 can be sprayed onto the evaporation surface(s) of the evaporator 9, such as tube surfaces. Aqueous vapor from the evaporator 9 is adsorbed on the AD cycle adsorbent beds 10 and 11. The remaining concentrated liquid brine can be rejected from the evaporator 9 through a liquid outlet. The heat of condensation from AD condenser 7 is supplied to AD evaporator 9 for evaporation by close loop liquid circulation 14.

The AD cycle can employ one or more adsorber chambers 10, 11. In an aspect, when a plurality of adsorber chambers are employed, they can be staged and operated in parallel each producing desorption vapor 15. Each adsorber chamber can include an vapor inlet in communication with the aqueous vapor outlet of the evaporator 9 and adsorbent material within the chamber. The adsorbent material 12 in each chamber can be packed around one or more heat transfer devices 13, such as heat transfer tubes 13 of a heat exchanger in the chamber(s). The chamber(s) 10, 11 can each have a fluid inlet and a fluid outlet configured to receive either a cooling fluid or a heating fluid. The heat transfer device(s) can also have a fluid inlet and a fluid outlet in communication with the fluid inlet and fluid outlet of the chamber(s) and configured to receive either the cooling fluid or the heating fluid for cooling or heating the adsorbent material, as desired.

The adsorbent material 12 can adsorb and desorb water vapor introduced into the chamber(s) from the evaporator 9. In operation, cooling fluid can be provided through the fluid inlet of a chamber and through a heat transfer device 13 causing a cooling of the adsorbent material and causing the adsorbent material to adsorb water vapor introduced from the evaporator 9 into the chamber 10, 11. The vapor can be adsorbed at low pressure, for example 1-2 kPa or less and a low temperature, for example 300C or less. Flow of cooling fluid can be terminated and heat can be applied to the adsorbent material by passing a heating fluid through the fluid inlets and outlets of the chamber and heat transfer device(s) causing the adsorbent material to release desorption vapor 15 into the condenser chamber. Desorbed vapor 15 is condensed as a fresh water from AD condenser 7.

The chamber(s) can be cycled between a cooling and a heating of the adsorbent material to continuously adsorb and desorb the water aqueous vapor. A plurality of chambers can be employed such that at least one chamber is always being cooled to adsorb water vapor while another chamber is being heated to desorb water vapor. In this way water vapor from the evaporator 9 can be continuously feed to at least one chamber that is undergoing a cooling. The adsorbent material 12 can be any hydrophilic porous material. In various aspects, the adsorbent material can be an absorbent material with a surface area higher than 400 $m^2/g$. In any one or more aspects, the absorbent material can be comprised of a silica gel or any one or more zeolites. The zeolites can be natural or synthetic microporous, aluminosilicate minerals. The zeolites can have a porous structure that can accommodate a variety of cations. They can include mineral zeolites such as analcime, chabazite, clinoptilolite, heulandite, natrolite, phillipsite, and stilbite. The silica gel can be a chemically inert, polar amorphous form of $SiO_2$.

Desorbed water vapor 15 can be delivered from the one or more adsorber chambers to the condenser 7 of the AD cycle where it can be mixed with vapor delivered to the condenser 7 from the MD unit 4, and ultimately heat of condensation can be recovered 14 from the desorption vapor 15 by condensation of the vapor in the AD condenser 7, in a closed loop. In one or more aspects, the desorption vapor 15 delivered to the AD condenser 7 can be in the range of about 42° C. to about 46° C.

During the adsorption process, the heat of adsorption can be rejected to a cooling fluid tank 17. Cooling fluid can be provided from the cooling fluid tank 17 through a cooling tower 16 back to the one or more adsorber chambers 10, 11. In various aspects, the cooling fluid provided from the cooling tower 16 to the one or more adsorber chambers 10, 11 can be in the range of about 32° C. to about 35° C., preferably about 30° C. The cooling fluid can be a cooling water. The adsorbent 12 can be regenerated by removing the previously adsorbed vapor by the heating fluid circuit 18, in a closed loop. In an aspect, the heating fluid can be hot water.

The whole system can be placed under a low pressure, such as a vacuum condition. The vacuum condition can involve application of negative pressure. MD system vacuum can be maintained by continuous vapor condensation in the AD condenser 7. The heating fluid after desorption 19 can be utilized to preheat the feed to the MD unit 4 via heat exchanger 2. This can fully utilize the waste heat potential. The vapor can be condensed inside the AD condenser 7 where the latent heat can be recovered to power the AD evaporator 9 by delivering heating fluid from the AD condenser 7 to the AD evaporator 9. This heating fluid can also be hot water. Condensate (distillate) from the AD condenser 7 in the form of useable water can be collected in the collection tank 6. As shown in FIG. 1, the system can include various valves and pumps for the various conduits, along with pressure and temperature sensors as needed, for example to control the cycling of the cooling and heating of the adsorbent material in the chambers 10, 11.

In this embodiment, the hybridization provides improved water production by utilizing MEMD brine in the AD evaporator 9 and hence improvement of specific energy consumption and water production can be realized. The system can offer a wider exploration by combining innovative and alternative technologies to propel the applicability and suitability of MD for different applications, such as the desalination industry.

The MD process portion of the system and process in FIG. 1 is shown as a multi-effect membrane distillation (MEMD) system including a plurality of membrane distillation modules. A simplified schematic of an embodiment of an MD module 210 for use in MD unit 4 of the present disclosure is shown in FIG. 2. In an aspect, the MD module 210 includes a source of preheated aqueous feed 3. In one or more aspects the source of preheated aqueous feed 3 can include a supply line 225 and a pump 226 to supply preheated aqueous feed 3 to the MD module 210.

Module 210 can include a housing or enclosure within which a warm or hot aqueous feed section or compartment 212 and an aqueous vapor or permeate section or compartment 216 can be housed. A membrane 214 can be provided between the warm feed section 212 and the permeate section 216. In an aspect the permeate section 216 can include a gap, such as an air gap. In any one or more aspects, the membrane 214 can be either a hollow fiber, tubular or flat sheet standard membrane used for MD process, such as a microporous hydrophobic membrane. The feed section 212 can be considered the high pressure side of the membrane, and the permeate section 216 can be considered the low pressure side of the membrane. By high pressure we mean that the high pressure side has a relatively higher pressure than the pressure of the low pressure side. And by low pressure we mean that the low pressure side has a pressure relatively lower than that of the high pressure side.

Module 210 can include a preheated aqueous liquid feed inlet 222 for providing warm or hot aqueous liquid feed (e.g., warm seawater) from supply line 225 to the warm feed section 212. The warm feed section 212 can also include an aqueous liquid outlet 224 for passing aqueous liquid feed (e.g., concentrated seawater) out of the warm fluid section 212 and out of module 210.

When the aqueous vapor passes (permeates) through the membrane 214 with a partial pressure difference across the membrane due to the temperature difference created by flowing the preheated liquid aqueous feed across the warm or hot side of the membrane 214, aqueous vapor is generated from the warm liquid aqueous feed and passes through the MD membrane 214 into the permeate section 216. This vapor, also referred to as permeate, will ultimately condense when it comes into contact with a condensing surface, such as that in condenser 7 (e.g., a condensation plate).

In an embodiment, vacuum can be maintained in the permeate section 216 through communication with the AD cycle by the negative pressure in the AD condenser 7. Vacuum can also be maintained by an optional vacuum pump 232. Aqueous vapor can be withdrawn by the negative pressure in the AD condenser 7, or pumped out via pump 232 and can be used for fresh water requirements or any other purpose. In one or more aspects the recovered water can undergo suitable re-mineralization. Alternatively, a positive air pressure can be used to withdraw aqueous vapor from section 216, such as a sweeping air passed through section 216.

Figure 2:
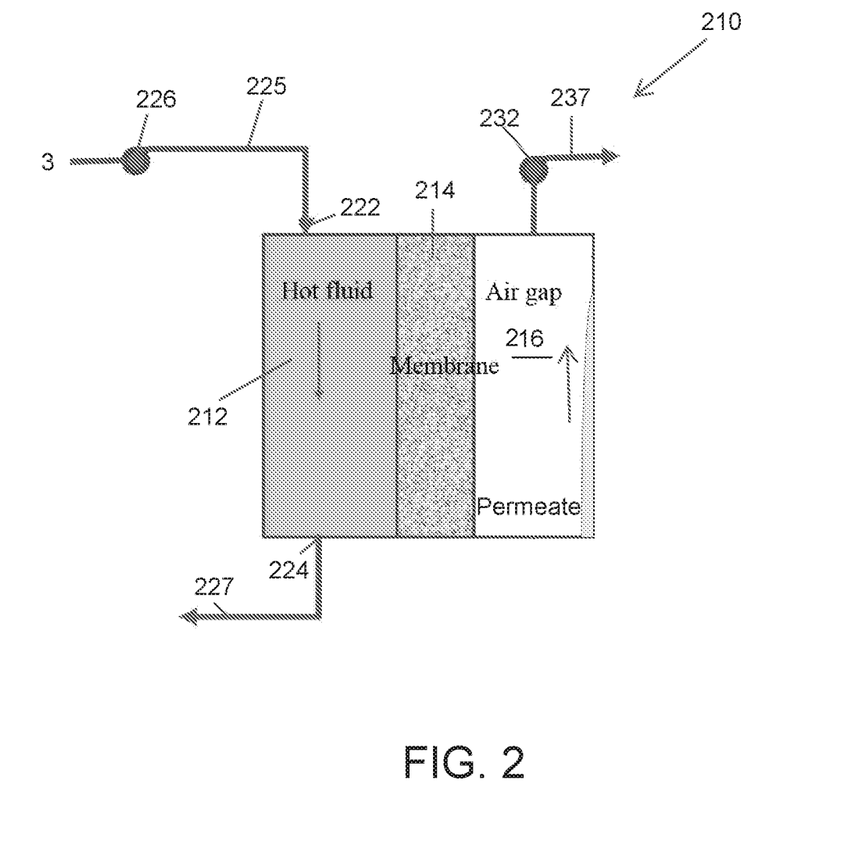
FIG. 2 depicts a membrane distillation module for use in the present disclosure.

Thus, FIG. 2 depicts an embodiment of an MD module configuration for use in the present system, it is possible to integrate any MD module configuration into the system, such as: direct contact membrane distillation (DCMD), vacuum membrane distillation (VMD), air gap membrane distillation (AGMD), material gap membrane distillation (MGMD), and sweeping gas membrane distillation (SGMD) modules.

Accordingly, it can be seen that the present disclosure utilizes thermal energy potential in the feed stream or waste heat and maximizes the potable water (desalting) production by synergistic arrangement of the Membrane Distillation (MD) and Adsorption Distillation (AD) cycles. The hybridization helps to utilize MD brine, as an example, for higher recovery at lower temperature operation of AD. Since AD evaporator can operate as low as 10° C. so it also reduces the risks of corrosion and fouling at high feed concentrations. Waste heat extracted after desorption can be utilized in preheating the MD feed to improve the system's performance. AD provides coolant and/or vacuum to run the MD process without the need for external vacuum or cooling energies.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

REFERENCES

1. Alsaadi, A., L. Francis, H. Maab, G. Amy, N. Ghaffour, Evaluation of air gap membrane distillation process running under sub-atmospheric conditions: Experimental and simulation studies. Journal of Membrane Science. 2015; 489: ( ) 73-80.
2. Alsaadi, A., L. Francis, H. Maab, G. Amy, N. Ghaffour, Experimental and theoretical analyses of temperature polarization effect in vacuum membrane distillation. Journal of Membrane Science. 2014; 471: ( ) 138-148.
3. Chen Y-H, Li Y-W, Chang H. Optimal design and control of solar driven air gap membrane distillation desalination systems. Applied Energy. 2012; 100:193-204.
4. Francis, L., N. Ghaffour, A. Al-Saadi, S. P. Nunes, G. L. Amy, Performance evaluation of the DCMD desalination process under bench scale and large scale module operating conditions. Journal of Membrane Science. 2014; 455: ( ) 103-112.
5. Francis, L., N. Ghaffour, A. Alsaadi, G. Amy, Material gap membrane distillation: A new design for water vapor flux enhancement. Journal of Membrane Science. 2013; 448: ( ) 240-247.
6. Ghaffour, N., S. Lattemann, T. M. Missimer, K. C. Ng, S. Sinha, G. Amy, Renewable energy-driven innovative energy-efficient desalination technologies. Applied Energy. 2014; 136: 1155-1165.
7. He F, Gilron J, Sirkar K K. High water recovery in direct contact membrane distillation using a series of cascades. Desalination. 2013; 323:48-54.
8. Kim Y D, Thu K, Ghaffour N, Choon Ng K. Performance investigation of a solar-assisted direct contact membrane distillation system. Journal of Membrane Science. 2013; 427:345-64.
9. Khayet M. Membranes and theoretical modeling of membrane distillation: A review. Advances in Colloid and Interface Science. 2011; 164:56-88.

10. Matsukata M, Sawamura K-i, Sekine Y, Kikuchi E. Chapter 8—Review on Prospects for Energy Saving in Distillation Process with Microporous Membranes. In: Oyama S T, Susan M S-W, editors. Membrane Science and Technology: Elsevier; 2011. p. 175-93.
11. Ng K C, Thu K, Chakraborty A, Saha B B, Chun W G. Solar-assisted dual-effect adsorption cycle for the production of cooling effect and potable water. International Journal of Low-Carbon Technologies. 2009; 4:61-7.
12. Thu K. Adsorption desalination: Theory & Experiments National University of Singapore; 2010.
13. Thu K, Chakraborty A, Kim Y D, Myat A, Saha B B, Ng K C. Numerical simulation and performance investigation of an advanced adsorption desalination cycle. Desalination. 2013; 308:209-18.
14. Thu K, Kim Y D, Myat A, Chakraborty A, Ng K C. Performance investigation of advanced adsorption desalination cycle with condenser-evaporator heat recovery scheme. Desalination and Water Treatment. 2013; 51:150-63.
15. Thu K, Ng K C, Saha B B, Chakraborty A, Koyama S. Operational strategy of adsorption desalination systems. International Journal of Heat and Mass Transfer. 2009; 52:1811-6.
16. Van der Bruggen B, Vandecasteele C. Distillation vs. membrane filtration: Overview of process evolutions in seawater desalination. Desalination. 2002; 143:207-18.

Therefore, the following is claimed:

1. A system for desalination of aqueous feed, the system comprising:
   a membrane distillation unit, the membrane distillation unit including a vapor permeable membrane and a high pressure side to one side of the membrane and a low pressure side to a side of the membrane opposite the high pressure side for receiving aqueous vapor permeate that passes from the high pressure side through the membrane to the low pressure side, the high pressure side having a higher vapor pressure relative to the low pressure side, the high pressure side having an aqueous feed liquid inlet and a liquid outlet, and the low pressure side having a permeate vapor outlet;
   a preheater having an aqueous feed liquid inlet and an aqueous feed liquid outlet, the aqueous feed liquid outlet being in communication with the aqueous feed liquid inlet of the membrane distillation unit, the preheater having a heating fluid inlet and an outlet for heating fluid;
   an evaporator in communication with the liquid outlet of the membrane distillation unit, the evaporator having a fluid inlet configured to provide heat of evaporation to aqueous liquid in the evaporator received from the liquid outlet of the membrane distillation unit and a fluid outlet configured to discharge fluid from the evaporator, the evaporator having a vapor outlet for discharging vapor formed by evaporation of aqueous liquid in the evaporator received from the aqueous liquid outlet of the membrane distillation unit;
   at least one adsorption-desorption unit, the at least one adsorption-desorption unit having a vapor inlet in communication with the vapor outlet of the evaporator and configured to receive aqueous vapor from the evaporator, the at least one adsorption-desorption unit including an adsorption-desorption bed, the adsorption-desorption bed including a fluid inlet configured to receive either a heating or a cooling fluid and a fluid outlet, the at least one adsorption-desorption unit having a vapor outlet, the at least one adsorption-desorption unit further including a fluid inlet in communication with the fluid inlet of the adsorption-desorption bed, the at least one adsorption-desorption unit including a fluid outlet in communication with the fluid outlet of the adsorption-desorption bed and in communication with the heating fluid inlet of the preheater; and
   a condenser including a condensation surface and a vapor inlet in communication with the permeate vapor outlet of the membrane distillation unit and the vapor outlet of the at least one adsorption-desorption unit, the vapor inlet of the condenser configured to deliver vapor from the membrane distillation unit and the at least one adsorption-desorption unit to the condensation surface, the condenser including a condensation outlet configured to remove condensate from the condenser, the condenser including a fluid inlet configured to deliver fluid from the evaporator to a surface of the condensation surface and to cool the condensation surface, and a fluid outlet configured to return the fluid from the condenser back to the evaporator and ultimately for return of the fluid to the fluid inlet of the condenser in a closed loop.

2. The system of claim 1, wherein the membrane distillation unit includes a plurality of membrane distillation modules configured for multi-effect membrane distillation, each of the plurality of membrane distillation modules including a vapor permeable membrane and a high pressure side to one side of the membrane and a low pressure side to a side of the membrane opposite the high pressure side for receiving aqueous vapor permeate that passes from the high pressure side through the membrane to the low pressure side, the high pressure side having a higher vapor pressure relative to the low pressure side, the high pressure side having an aqueous feed liquid inlet and a liquid outlet, and the low pressure side having a permeate vapor outlet, the permeate vapor outlet of each of the membrane distillation modules being in communication with the aqueous vapor inlet of the condenser.

3. The system of claim 1, wherein the fluid outlet of the at least one adsorption-desorption unit, the heating fluid inlet and outlet of the preheater and the fluid inlet of the at least one adsorption-desorption unit are in a closed loop configured to provide heating fluid and heat of desorption to the adsorption-desorption bed and waste heat from the at least one adsorption-desorption unit to the preheater for preheating the aqueous feed to the preheater.

4. The system of claim 1, wherein the adsorption-desorption bed includes a hydrophilic porous material having a surface area higher than 400 $m^2/g$.

5. The system of claim 1, wherein the fluid inlet and outlet of the at least one adsorption-desorption unit are part of a closed loop configured to provide a cooling fluid to the adsorption-desorption bed.

6. The system of claim 1, wherein the at least one adsorption-desorption unit includes a plurality of adsorption-desorption chambers, each of the chambers having a vapor inlet in communication with the vapor outlet of the evaporator and configured to receive vapor from the evaporator, each of the chambers further including an adsorption-desorption bed, the adsorption-desorption bed including a fluid inlet configured to receive either a heating or a cooling fluid and a fluid outlet, and having a vapor outlet, each of the chambers further including a fluid inlet in communication with the fluid inlet of the adsorption-desorption bed, and a fluid outlet in communication with the fluid outlet of the adsorption-desorption bed and in communication with the heating fluid inlet of the preheater.

7. The system of claim 1, wherein the condenser is configured to operate under vacuum.

8. The system of claim 1, wherein the fluid inlet and outlet of the evaporator and the fluid inlet and outlet of the condenser are in a closed loop configured to provide a heating fluid to the evaporator and return the fluid to the condenser as a cooling fluid for the condenser.

9. The system of claim 1, wherein the low pressure side of the membrane distillation modules of a multi effect or a multi stage membrane distillation unit is controlled by the condenser.

10. A method for desalination of aqueous feed, the method comprising:
    a) providing a membrane distillation unit, the membrane distillation unit including a vapor permeable membrane and a high pressure side to one side of the membrane and a low pressure side to a side of the membrane opposite the high pressure side, the high pressure side having a higher vapor pressure relative to the low pressure side, the high pressure side having an aqueous feed liquid inlet and a liquid outlet, and the low pressure side having a permeate vapor outlet;
    b) providing a preheater having an aqueous feed inlet and an aqueous feed outlet, heating an aqueous feed liquid by the preheater and delivering the heated aqueous feed liquid into the high pressure side of the membrane distillation unit through the aqueous feed liquid inlet of the membrane distillation unit, the preheater having a heating fluid inlet and an outlet for heating fluid;
    c) passing aqueous vapor permeate from the high pressure side of the membrane distillation unit through the membrane to the low pressure side of the membrane distillation unit;
    d) providing an evaporator, the evaporator in communication with the liquid outlet of the membrane distillation unit, the evaporator having a fluid inlet configured to provide heat of evaporation to aqueous liquid in the evaporator received from the liquid outlet of the membrane distillation unit and a fluid outlet configured to discharge fluid from the evaporator, the evaporator having a vapor outlet for discharging vapor formed by evaporation of the aqueous liquid in the evaporator received from the aqueous liquid outlet of the membrane distillation unit, taking aqueous liquid from the high pressure side of the membrane distillation unit and supplying to the evaporator thereby evaporating at least a portion of the aqueous liquid to produce an aqueous vapor;
    e) providing at least one adsorption-desorption unit, the at least one adsorption-desorption unit having a vapor inlet configured to receive the aqueous vapor from the evaporation evaporator, each of the at least one adsorption-desorption unit including an adsorption-desorption bed, the at least one adsorption-desorption unit including a fluid inlet configured to receive either a heating or a cooling fluid and a fluid outlet, the adsorption-desorption unit having a vapor outlet, the adsorption-desorption unit further including a fluid inlet in communication with the fluid inlet of the adsorption-desorption bed, the adsorption-desorption unit including a fluid outlet in communication with the fluid outlet of the adsorption-desorption bed and in communication with the heating fluid inlet of the preheater;
    g) providing a condenser, the condenser including a condensation surface and a vapor inlet in communication with the permeate vapor outlet of the membrane distillation unit and the vapor outlet of the at least one adsorption-desorption unit, the vapor inlet of the condenser configured to deliver vapor from the membrane distillation unit and the at least one adsorption-desorption unit to the condensation surface, the condenser including a condensation outlet configured to remove condensate from the condenser, the condenser including a fluid inlet configured to deliver fluid from the evaporator to the condensation surface and to cool the condensation surface, and a fluid outlet configured to return the fluid from the condenser back to the evaporator and ultimately for return of the fluid to the fluid inlet of the condenser in a closed loop, taking the aqueous vapor that has been absorbed and desorbed by the at least one absorption-desorption unit and condensing the aqueous vapor by the condenser to produce a desalinated aqueous product and taking the aqueous vapor permeate from the low pressure side of the membrane distillation unit and condensing the aqueous vapor permeate by the condenser to produce aqueous product.

11. The method of claim 10, wherein the membrane distillation unit includes a plurality of membrane distillation modules configured for multi-effect membrane distillation, each of the plurality of membrane distillation modules including a vapor permeable membrane and a high pressure side to one side of the membrane and a low pressure side to a side of the membrane opposite the high pressure side for receiving aqueous vapor permeate that passes from the high pressure side through the membrane to the low pressure side, the high pressure side having a higher vapor pressure relative to the low pressure side, the high pressure side having an aqueous feed liquid inlet and a liquid outlet, and the low pressure side having a permeate vapor outlet, the permeate vapor outlet of each of the plurality of membrane distillation modules being in communication with the aqueous vapor inlet of a the condenser.

12. The method of claim 10, wherein the fluid outlet of the at least one adsorption-desorption unit, the heating fluid inlet and outlet of the preheater and the fluid inlet of the at least one adsorption-desorption unit are in a closed loop configured for providing heating fluid and heat of desorption to the adsorption-desorption bed and waste heat from the at least one adsorption-desorption unit to the preheater for heating the aqueous feed to the preheater.

13. The method of claim 10, wherein the adsorption-desorption bed includes a hydrophilic porous material having a surface area higher than 400 $m^2/g$.

14. The method of claim 10, wherein the fluid inlet and outlet of the at least one adsorption-desorption unit are part of a closed loop configured for providing a cooling fluid to the adsorption-desorption bed.

15. The method of claim 10, wherein the at least one adsorption-desorption unit includes a plurality of adsorption-desorption chambers, each of the chambers having a vapor inlet for receiving aqueous vapor from the evaporator, each of the chambers further including an adsorption-desorption bed, each adsorption-desorption bed including a fluid inlet configured for receiving either a heating or a cooling fluid and a fluid outlet, and having a vapor outlet, each of the chambers further including a fluid inlet in communication with the fluid inlet of the adsorption-desorption bed, and a fluid outlet in communication with the fluid outlet of the adsorption-desorption bed and in communication with the heating fluid inlet of the preheater.

16. The method of claim 10, wherein the condensing of the aqueous vapor from the at least one adsorption-desorption unit is done under vacuum.

17. The method of claim 10, including heating a fluid used for condensing the aqueous vapor from the at least one adsorption-desorption unit from the heat of condensation of the aqueous vapor and using the heated fluid for evaporating the at least a portion of the aqueous liquid from the membrane distillation unit and after the evaporation returning the fluid to be used for condensing aqueous vapor from the at least one adsorption-desorption unit.

* * * * *